United States Patent [19]

Hehlen et al.

[11] Patent Number: 4,673,256

[45] Date of Patent: Jun. 16, 1987

[54] PROCESS FOR CONTROLLING A MATRIX ACCESS DISPLAY DEVICE

[75] Inventors: Robert Hehlen, Morangis; Michel Hareng, La Norville; Serge Le Berre, Dampierre; Bruno Mourey, Boulogne Billancourt, all of France

[73] Assignee: Thomson-CSf, Paris, France

[21] Appl. No.: 674,868

[22] Filed: Nov. 26, 1984

[30] Foreign Application Priority Data

Nov. 29, 1983 [FR] France ................. 83 19022

[51] Int. Cl.$^4$ .............................. G02F 1/133
[52] U.S. Cl. .................. 350/350 S; 350/333; 340/778; 358/230
[58] Field of Search ............. 350/350 S, 333; 340/778; 358/230

[56] References Cited

U.S. PATENT DOCUMENTS

| | | | |
|---|---|---|---|
| 3,754,230 | 8/1973 | Auger | 340/778 |
| 4,082,430 | 4/1978 | Schulthess et al. | 350/333 |
| 4,137,551 | 1/1979 | Rajchman | 358/230 |
| 4,508,429 | 4/1985 | Nagae et al. | 350/350 S |
| 4,525,708 | 6/1985 | Hareng et al. | 350/350 S |

FOREIGN PATENT DOCUMENTS 0055153  6/1982  European Pat. Off. .

OTHER PUBLICATIONS

1982 Sid International Symposium, Digest of Technical Papers, lere edition, mai 1982, Lewis Winner, Coral Cables, Florida (US); Sun Lu et al; "Thermally-addressed pleochroic dye switching liquid crystal display", pp. 238-239.

*Primary Examiner*—John K. Corbin
*Assistant Examiner*—Martin Lerner
*Attorney, Agent, or Firm*—Oblon, Fisher, Spivak, McClelland & Maier

[57] ABSTRACT

The invention relates to controlling a matrix access display device comprising a layer of material reacting to a combined thermal and electric effect. According to the invention, the DC video control voltage is transformed into an AC voltage by switching the potentials of the electrodes applying the electric control field.

7 Claims, 10 Drawing Figures

PROCESS FOR CONTROLLING A MATRIX ACCESS DISPLAY DEVICE

BACKGROUND OF THE INVENTION

The present invention relates to a process for controlling a display device comprising a layer of active material reacting to a combined thermal and electric effect. It relates more particularly to the control of smectic liquid crystal devices of the matrix addressed type.

Smectic liquid crystal display devices have formed the subject of numerous studies and publications. In particular, devices of the matrix addressed type have compelled recognition in many applications. Addressing takes place in two stages: first of all the liquid crystal zone to be addressed is heated to a temperature corresponding to the isotrope phase, then during cooling thereof this zone is subjected to an electric field whose amplitude depends on the information to be written in, this field acting on the optical qualities of the zone concerned.

DESCRIPTION OF THE PRIOR ART

In general, matrix addressing is achieved by means of two crossed electrode networks imprisoning a layer of electro-optical material and the electric control fields are created by applying voltages to the terminals of these two electrode networks. It is known that liquid crystals generally withstand AC voltages better than DC voltages, these latter having, among other things, an adverse influence on their life span. This is why nematic liquid crystal devices are generally controlled by AC voltages. Although the smectic liquid crystals are less sensitive to the DC component of an electric control voltage, it is nevertheless true that their lifespan is greatly improved by an AC control from which the DC component has been removed. It can be concluded therefrom that it is preferable for the control voltages of smectic liquid crystal devices to be AC voltages. However, the fact of thermally addressing one of the electrode networks complicates the alternate addressing of the matrix. In fact, each heating electrode of the matrix receives sequentially a heating pulse during a given time and plays the role of resistive element one end of which is connected to the ground of the device. Now, for reasons of electric isolation of the transistors of the video control circuits, it is preferable for the heating electrodes to be able to receive potentials, corresponding to video voltages, different from zero alternating with zero potentials. This is not possible with known devices in which the heating electrodes have one of their ends to ground.

SUMMARY OF THE INVENTION

To overcome this disadvantage, the invention provides a process for controlling the display device in which the electric field controlling the electro-optic material is generated from a DC voltage transformed into an AC voltage by switching the potentials of the electrodes applying the electric control field. A particular configuration of the display device or an electronic switching system allows the process to be implemented.

The invention provides then a process for controlling a display device comprising an active material layer reacting to a combined thermal and electric effect, the device comprising a first and a second electrode networks, these networks being crossed so as to provide matrix addressing of the device, the electrodes of the first network allowing zones of said layer to be heated successively, electric control fields being applied to said zones during cooling thereof for a predetermined time by electrodes surrounding said layer, said electric fields being generated from DC control voltages called video voltages, wherein in order to remove any DC component from the electric fields applied to said layer, the electrodes for applying said fields are brought to potentials such that said electric control fields are directed alternately in one direction then in the opposite direction.

BRIEF DESCRIPTION OF THE DRAWINGS

The invention will be better understood and other advantages will be clear from the following description and the accompanying Figures in which.

DETAILED DESCRIPTION OF THE PREFERRED EMBODIMENT

There exist two possibilities for applying an AC potential difference to an electro-optical material layer sandwiched between two electrodes.

Figure 1:
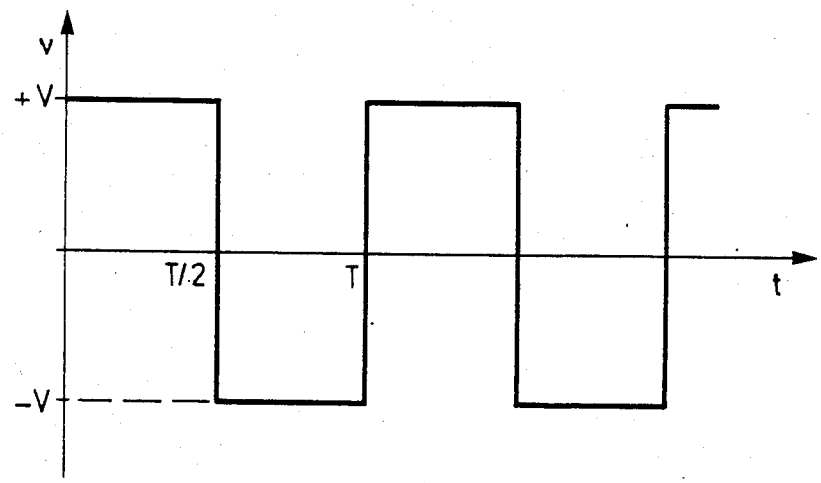
FIG. 1 is an explanatory diagram.

One of the electrodes can be held at a fixed potential, for example ground potential, and the potential of the other electrode can be varied on each side of the ground potential. FIG. 1 is a diagram which gives the trend of the voltage v to which an electro-optical material layer is subjected, with respect to time t. The voltage v is alternating, of period T. It is equal to $+V$ over a half period and to $-V$ over the next half period. The material layer sandwiched between the electrodes applying voltage v is, whatever the half period considered, always subjected to a voltage of amplitude V. This arrangement is convenient from the point of view of practical construction of the device but it results in the transistors of the video control circuits having to withstand an electric isolation equal to 2 V. Since the amplitude of V is generally between 15 and 30 volts, the output transistors must withstand between 30 and 60 volts. This imposes a choice of the technology to be used for constructing the control circuits, which has repercussions on the quality of the integration of these circuits.

Another way of applying an AC potential difference to the layer of electro-optical material consists in alternating the potentials on each electrode. For the duration of a half period, one of the electrodes will be at potential V and the other at zero; during the next half period, this will be the opposite. Thus, the electro-optical material is always subjected to a voltage of amplitude V but the transistors of the control circuits now only need withstand an isolating voltage V. This means that a technology for manufacturing transistors may be used which lends itself particularly well to integration. This is the solution which is used for addressing nematic liquid crystal devices. The transfer of this solution to combined thermal and electric access devices cannot be applied straight off. In fact, these devices generally comprise a network of heating electrodes which all have one end connected to ground and consequently a potential fixed once and for all.

Figure 2:
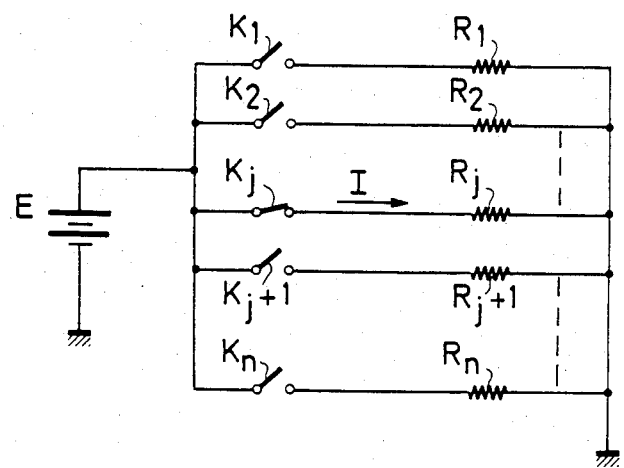
FIG. 2 is an equivalent electric diagram.

FIG. 2 is an electric diagram showing a heating electrode network and the means for heating same. These electrodes, symbolized by their resistances $R_1$ to $R_n$, form one of the electrode networks contributing to the matrix addressing of a conventional smectic liquid crystal display screen. These are for example the line connections of the matrix, the video voltages being distributed by the column connections not shown. The means for heating the heating elelctrodes are formed by a voltage generator E and switches $K_1$ to $K_n$ which in practice will be transistors with on or off operation. The raising of the temperature of a heating electrode is caused by Joule effect when the corresponding switch is closed. As is well known, these electrodes are brought sequentially to a temperature such that they ensure the phase change of the liquid crystal zone situated opposite. When it is the turn of the electrode of rank j (designated by its resistance $R_j$) to be heated, switch $K_j$ is closed and the voltage generator E delivers a heating current I into $R_j$, all the other switches $K_1$ to $K_n$ being open. Since the screen may comprise a high number of heating electrodes (several hundreds), it is advantageous to connect their opposite ends to the ground switches. Since the heating time $\tau$ is very short, each electrode is in fact subjected to a voltage pulse. The video voltages corresponding to the line heater of rank j are applied through column connections just after the heating pulse and for a time $\tau'$ generally chosen equal to $\tau$. Application of the video control voltages takes place through the line connection or rank j and columns connections through ground which ensures the electric continuity. In this device of the prior art, the video control voltages are also supplied in the form of pulses. They have the same duration but their amplitudes vary depending on the degree of contrast desired from a zero value to a maximum value Vv. Since they are all of the same sign, the liquid crystal layer is always subjected to a harmful DC component.

The invention proposes removing this DC component by alternating the video control voltages for the elctro-optical material layer. Two cases may occur: the heating pulses follow each other in time either immediately (they are jointing), or with a time lag (they are non jointing).

Figure 3:
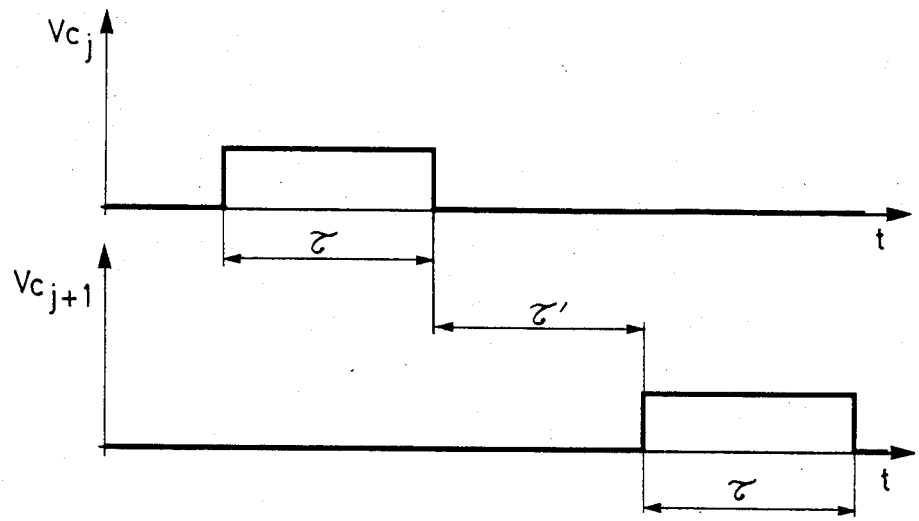
FIGS. 3 and 4 are explanatory diagrams.

The heating pulses are not jointing, more particularly, when the screen is of a large size, with direct reading and when the duration $\tau$ of the heating pulse is greater than 1 millisecond. The image is not refreshed and a memory effect exists. In this configuration the video voltages are applied just after the heating pulse. This is what is shown in FIG. 3 which is a comparative diagram of the succession of heating pulses as a function of time. The heating pulses have been shown for two consecutive heating electrodes which have ranks j and j+1. The voltage $Vc_j$ represents the heating pulse of line j; the voltage $Vc_{j+1}$ represents the heating pulse of line j+1. They have the same duration $\tau$. Between the end of the first pulse and the beginning of the second has elapsed a time $\tau'$ which is generally chosen equal to $\tau$. It is during this time $\tau'$ that the video voltages corresponding to line j, which has just been heated, will be applied.

Figure 4:
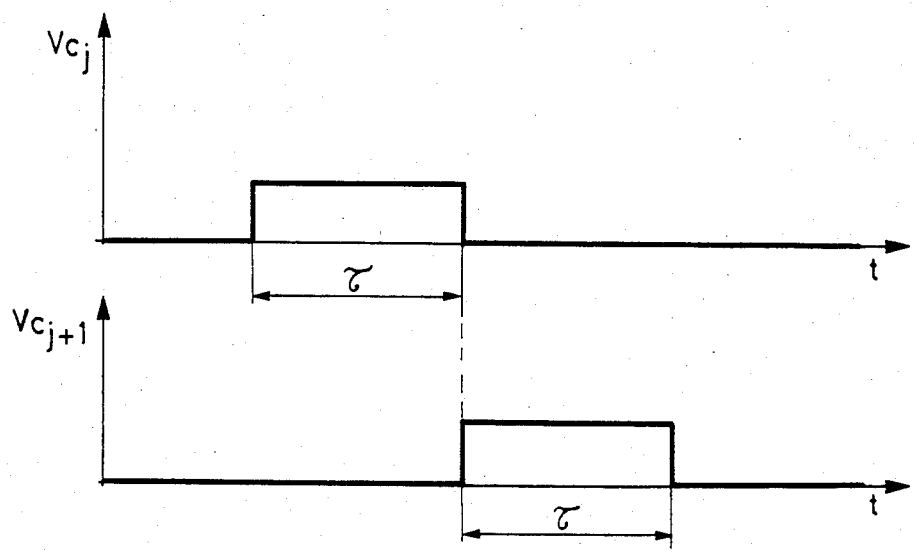

The heating pulses are jointing, more particularly when the screen is of small size, the image being projected and when the duration of the heating pulse $\tau$ is less than or equal to 64 microseconds, which corresponds to thermal access at television timing. The image is then refreshed. The video control voltages are applied to line j while line j+1 is heated. This is what the diagram of FIG. 4 shows.

When the pulses are not jointing, it is possible to modify the reference of the heating electrode network, i.e. the network of the line connections in the example of application chosen above, during the time of application of the video control voltages. The time of application of the video voltages is for example $\tau'$ as defined in FIG. 3. In this case, the potentials of the video voltages are applied to the column connections just after the heating pulse during $\tau'/2$, the corresponding line connection being at ground potential. Then during the remaining time $\tau'/2$, the potentials will be modified so as to compliment the potentials applied during the first period $\tau'/2$. These considerations will be explained in greater detail with reference to FIGS. 5, 6 and 7.

Figure 5:
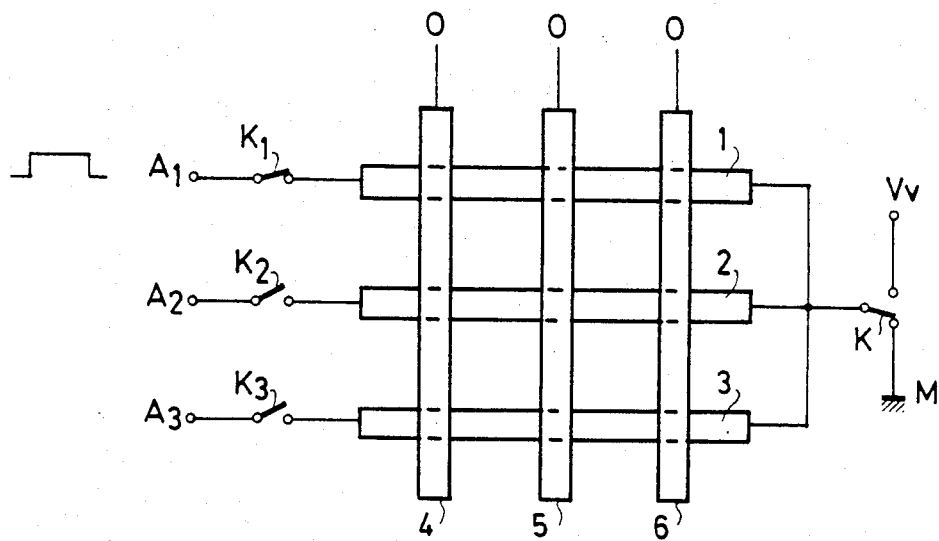
FIGS. 5, 6 and 7 are electric diagrams illustrative of the process of the invention.

FIG. 5 shows two crossed electrode networks of the type entering in the construction of a matrix addressed display screen as well as the associated elements for addressing same. So as not to complicate the Figure, electrode networks have been shown comprising only three line connections 1, 2 and 3 and three column connections 4, 5 and 6. The line connections have been chosen as heating electrodes. They may be addressed thermally through switches $K_1$, $K_2$, and $K_3$, which symbolize electronic components of the transistor type and by switch K. FIG. 5 shows the thermal addressing of the line connection 1. Switch $K_1$ being closed and switch K putting the circuit to ground M, a voltage pulse of amplitude of $VC_1$ and of width $\tau$ appearing between points $A_1$ and M causes heating of electrode 1 and of the part of the electro-optical layer situated between the two networks in facing relation and not shown in the Figure. With switches $K_2$ and $K_3$ open, electrodes 2 and 3 are not addressed thermally. It will also be noted that the potentials of the column connections are zero and that the potential Vv, defined above, does not affect the line connections because of the position of switch K. There is then no video control voltage applied to the electro-optical material layer.

Figure 6:
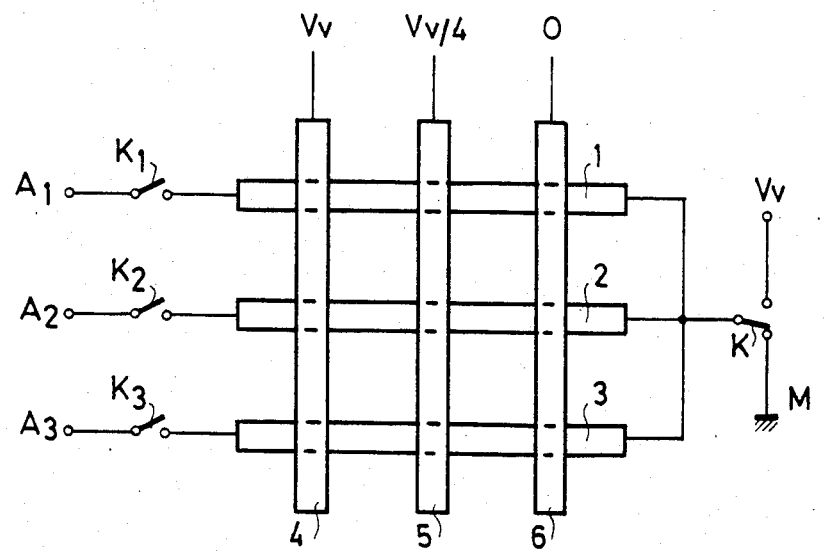
Figure 7:
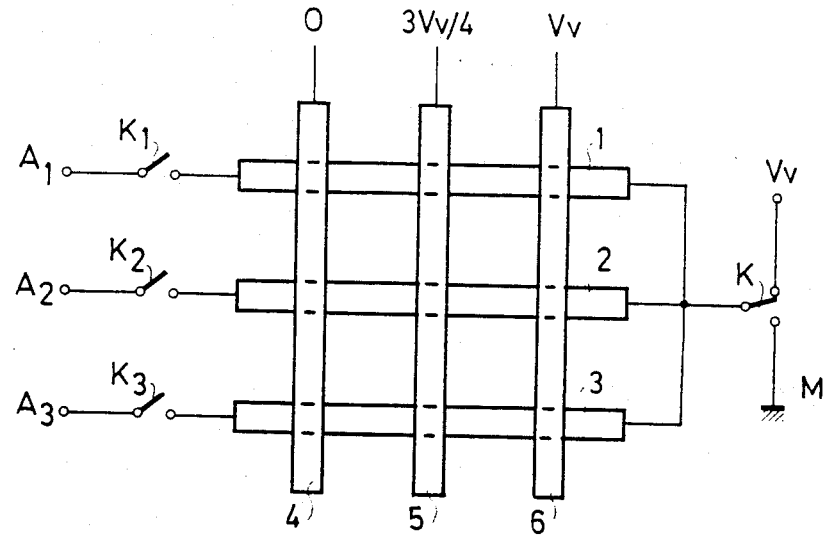

When the voltage pulse for heating electrode 1 is finished, there exists a time $\tau'$ during which no other electrode is heated and during which the video voltages are applied. FIGS. 6 and 7 are illustrative of this way of operating. In FIG. 6, switches $K_1$, $K_2$ and $K_3$ are open and switch K is left in the same position as before. The picture elements corresponding to the intersections of the line connection 1 and column connections 4, 5 and 6 are addressed by video control voltages whose randomly taken values are mentioned in FIG. 6. It can be seen that the picture element formed by the intersection of electrodes 1 and 4 is subjected to a potential difference equal to Vv. The potential difference between electrodes 1 and 5 is equal to Vv/4. That existing between electrodes 1 and 6 is zero. These potentials are maintained for the time $\tau'/2$.

At the end of this time $\tau'/2$, switch K is actuated in the other direction as shown in FIG. 7 which results in bringing the line connections to the potential Vv. At the same time, the potentials present at the column connections are complemented with respect to Vv as is shown in FIG. 7. Each picture element formed by the intersections of electrode 1 and electrodes 4, 5 and 6 is therefore subjected to the same potential difference as in the case of FIG. 6 but of the opposite sign.

The complementarity of the video voltages may be provided in a relatively simple way. There may for example be inserted between the stage delivering these voltages and the column connections a complementarity stage which operates in the following way:

during the first half period $\tau'/2$, this stage is transparent from an electric point of view and the video voltages are applied directly to the corresponding column conenctions (case of FIG. 6), until the end of this first half period when the video voltages are directed by simple electronic switching to the complementarity circuit properly speaking, during the second half period $\tau'/2$, each video voltage is sent for example to one of the two inputs of a conventional subtractor with operational amplifier which receives at its second input the voltage Vv, so as to obtain a complimentary output signal with respect to Vv of the video voltage (case of FIG. 7).

Once the period $\tau'$ is finished, the procedure is the same for line connections 2 and 3 using switches $K_2$ and $K_3$. The heating process is then applied, depending on the case between $A_2$ and M or between $A_3$ and M. It can be seen that this way of operating allows the DC components to be cancelled out which previously existed in the devices of the prior art, whether it be for saturated signals or for signals of variable amplitude.

Figure 8:
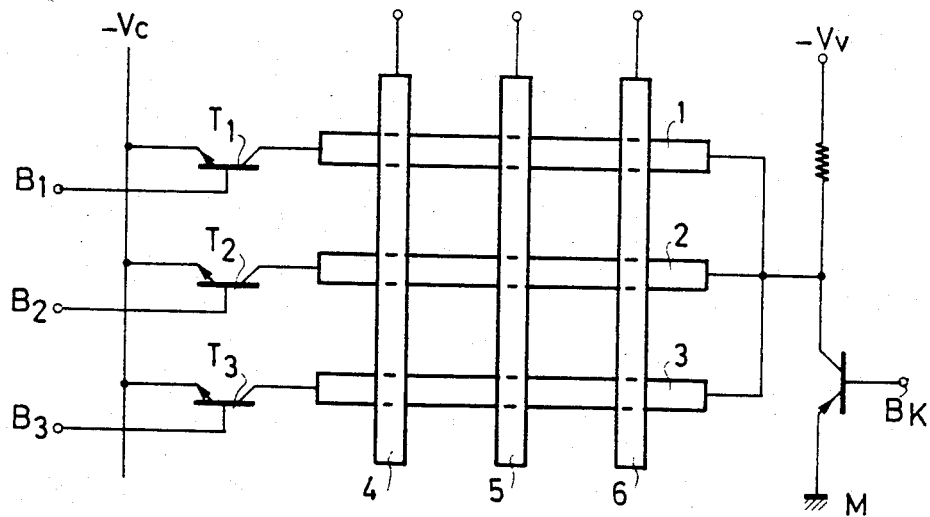
FIG. 8 is an example of a device for implementing the control process of the invention.

Numerous possibilities exist for embodying the control using a process according to the invention. FIG. 8 shows one possible embodiment. It uses the same matrix network as for the three proceeding Figures where the same references designate the same elements. Transistors $T_1$, $T_2$ and $T_3$ provide the functions of switches $K_1$, $K_2$, and $K_3$. The same goes for transistor $T_K$ with respect to switch K. For addressing the first line, electrode 1 must first of all be heated by joule effect for the time $\tau$. For that, transistor $T_1$ is caused to conduct by applying to its base $B_1$ a voltage force of duration $\tau$ which causes conduction thereof. At the same time, a voltage pulse is applied to the base $B_K$ of transistor $T_K$ in order to saturate it. Electrode 1 therefore has a heating current flowing therethrough for the time $\tau$ whereas electrodes 2 and 3 have no current flowing therethrough since $T_2$ and $T_3$ are still disabled. At the end of time $\tau$, $T_1$ is disabled, $T_K$ is still conducting since the voltage pulse at its base is still present during $\tau'/2$, and the video control voltages are applied. These video voltages are applied in the form of potentials to the column electrodes and by maintaining the line electrodes at ground potential. When this first period $\tau'/2$ is finished, the voltage pulse present at $B_K$ ends for a second period $\tau'/2$ and a transistor $T_K$ is disabled putting the line electrodes to the potential $-Vv$. At the same time, each column electrode is brought to a potential which is the complement with respect to $-Vv$ of potential present on said column during the first period $\tau'/2$. Display of the first line being finished, the second line when the third may be displayed in the same way.

When the heating pulses are jointing, the procedure which has just been described is difficult to apply. In fact, it is very difficult to bring a heating electrode to a potential Vv so as to complement the video information and to heat the same electrode by joule effect. In this case it is necessary to use another configuration for constructing the combined thermal and electric devices.

Figure 9:
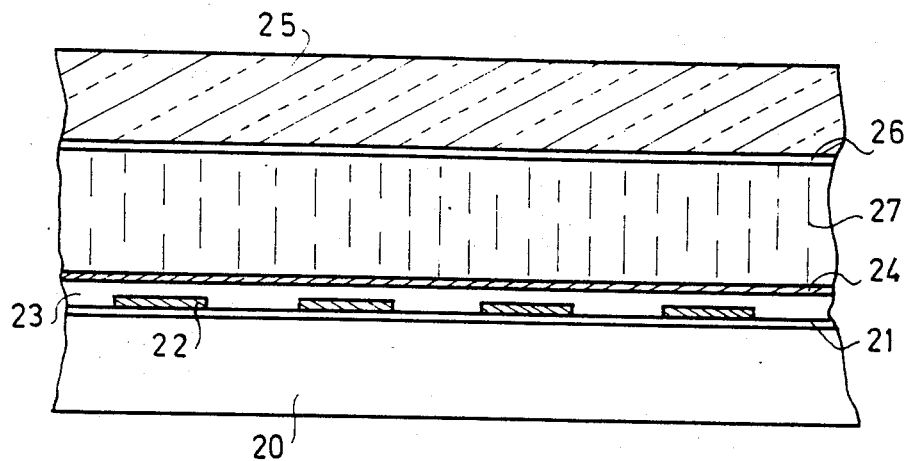
FIG. 9 is a partial sectional view of a display screen.

FIG. 9 shows a display device using a material there reacting to a combined thermal and electric effect and which may be used for implementing the control pulses of the invention. FIG. 9 is a partial sectional view and shows, by way of non limiting example, a smectic liquid crystal display screen of the matrix addressed type. A substrate 20 can be seen, for example made from monocrystalline silicon, coated with an insulating layer 21 which may be silicon oxide $SiO_2$. On layer 21 has been deposited a first electrode network 22 destined to play the role of heating electrodes. It is then advantageous to make them of aluminium. Electrodes 22, which are for example the line connections of the display matrix, are buried in an insulating layer 23, for example silicon nitride, which supports the second network of the matrix forming the column connections. These latter are formed by electrodes 24 made from a reflecting material such as aluminium. A glass plate 25 is held, by spacers not shown, at a distance of about 12 micrometers from electrode network 24. It supports a counter electrode 26 which extends over the whole of the active part of the screen. Counter electrode 26 is necessarily transparent. It is for example formed from combined tin and indium oxide. In the space defined by the spacers, a liquid crystal layer 27 is introduced having a smectic phase. In this configuration, the heating electrodes no longer serve as reference plane for application of the video control electric field which is applied between the column connections 24 and the counter electrode 26. With the device of FIG. 9, the potential of the counter electrode may without problem be the ground potential during half of the time of application of the video control voltage and during the other half of this time the potential Vv. This is what is shown in FIG. 10.

Figure 10:
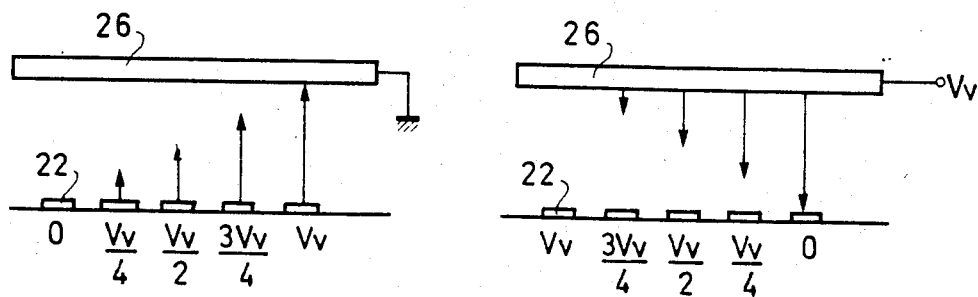
FIG. 10 is an illustration of how the control voltages are applied in accordance with the invention.

FIG. 10 shows schematically one example of applying video control voltages. The left hand part of the Figure is relative to the first half wave of the video signal and the right hand part to the second half wave of this signal. For the sake of simplicity, only the elements directly concerned have been shown in this Figure, namely the counter electrode 26 and the column connections 22. The distribution of the potentials for the first half wave of the video signal is as follows: counter electrode 26 is grounded, and the column connections 22 receive potentials increasing regularly from zero to Vv (maximum voltage applicable). During the second half wave of the video signal, it is the counter electrode 26 which is subjected to the potential Vv whereas the column connections are put to complimentary potentials with respect to Vv as is shown in the Figure. Rather than making the video voltage alternating after each line heating, the video voltage may be reversed at the timing of the frame or of the image if we assume that the display is substantially unmodified from one picture to the next. It may also be noted that the display screen shown in FIG. 9 may also be used when the heating pulses are not jointing.

The control pulses of the invention may then be used in all cases where it is undesirable to have a DC voltage permanently applied to an electro-optical material layer, in particular when it is a question of a smectic crystal layer.

What is claimed is:

1. In a process for controlling a display device comprising an active material layer reacting to a combined thermal and electric effect, the device comprising a first and second electrode networks, these networks being crossed so as to provide matrix addressing of the device, the electrodes of the first layer allowing zones of said layer to be heated successively, electric control fields being applied to said zones during cooling thereof for a predetermined time by electrodes surrounding said layer, said electric fields being generated from DC control voltages called video voltages, wherein, in order to remove any DC component from the electric fields applied to said layer, the electrodes applying said fields are brought to potentials such that said electric control fields are alternately directed in one direction then in the opposite direction.

2. The control process as claimed in claim 1, wherein said control video voltages are distributed by the surrounding electrodes formed on the one hand by the first electrode network and on the other by the second electrode network and, with the video voltage values varying from 0 to a maximum value Vv, alternation of the directions of said electric control fields is achieved by:

during the time of one half wave, bringing the potential of the heating electrode of a zone to be addressed to O whereas the electrodes of the second network are brought to potentials corresponding to said video potentials, during the time of the other half wave, bringing the potential of said heating electrode to the maximum value Vv whereas the electrodes of the second network are brought to potentials complementary with respect to Vv to those of the preceding half wave.

3. The control process as claimed in claim 2, wherein each of said half waves has a duration half of said predetermined duration.

4. The control process as claimed in claim 2, wherein each of said half waves lasts the time of an image.

5. The control process as claimed in claim 1, wherein the video control voltages are distributed by the surrounding electrodes formed on the one hand by a counter electrode and on the other by the second electrode network and, with the values of the video voltages varying from 0 to a maximum value Vv, alternation of the directions of said electric control fields is achieved by:

during the time of a half wave, bringing the potential of said counter electrode to 0 whereas the electrodes of the second electrode are brought to potentials corresponding to said video voltages, during the time of the other half wave, bringing the potential of said counter electrode to the maximum value Vv whereas the electrodes of the second network are brought to potentials complementary with respect to Vv to those of the preceding half wave.

6. The control process as claimed in claim 5, wherein each of said half waves has a duration half of said predetermined duration.

7. The control process as claimed in claim 5, wherein each of said half waves lasts the time of an image.

* * * * *